Oct. 30, 1934.  R. J. EVANS  1,978,744
POWER MOLD FILLING MACHINE
Filed Nov. 28, 1932  3 Sheets-Sheet 1
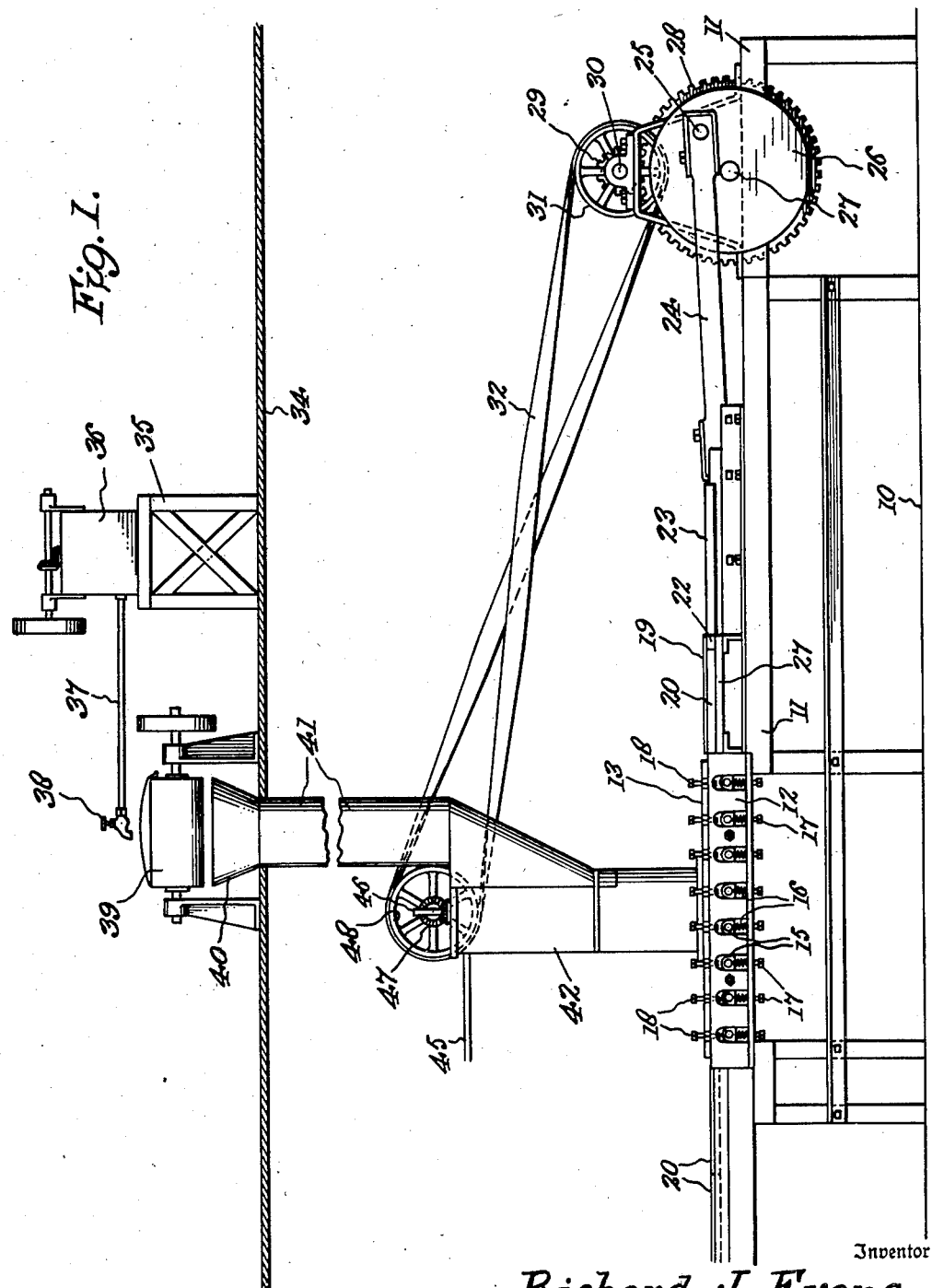
Inventor
Richard J. Evans
By Wilkinson & Mawhinney
Attorneys

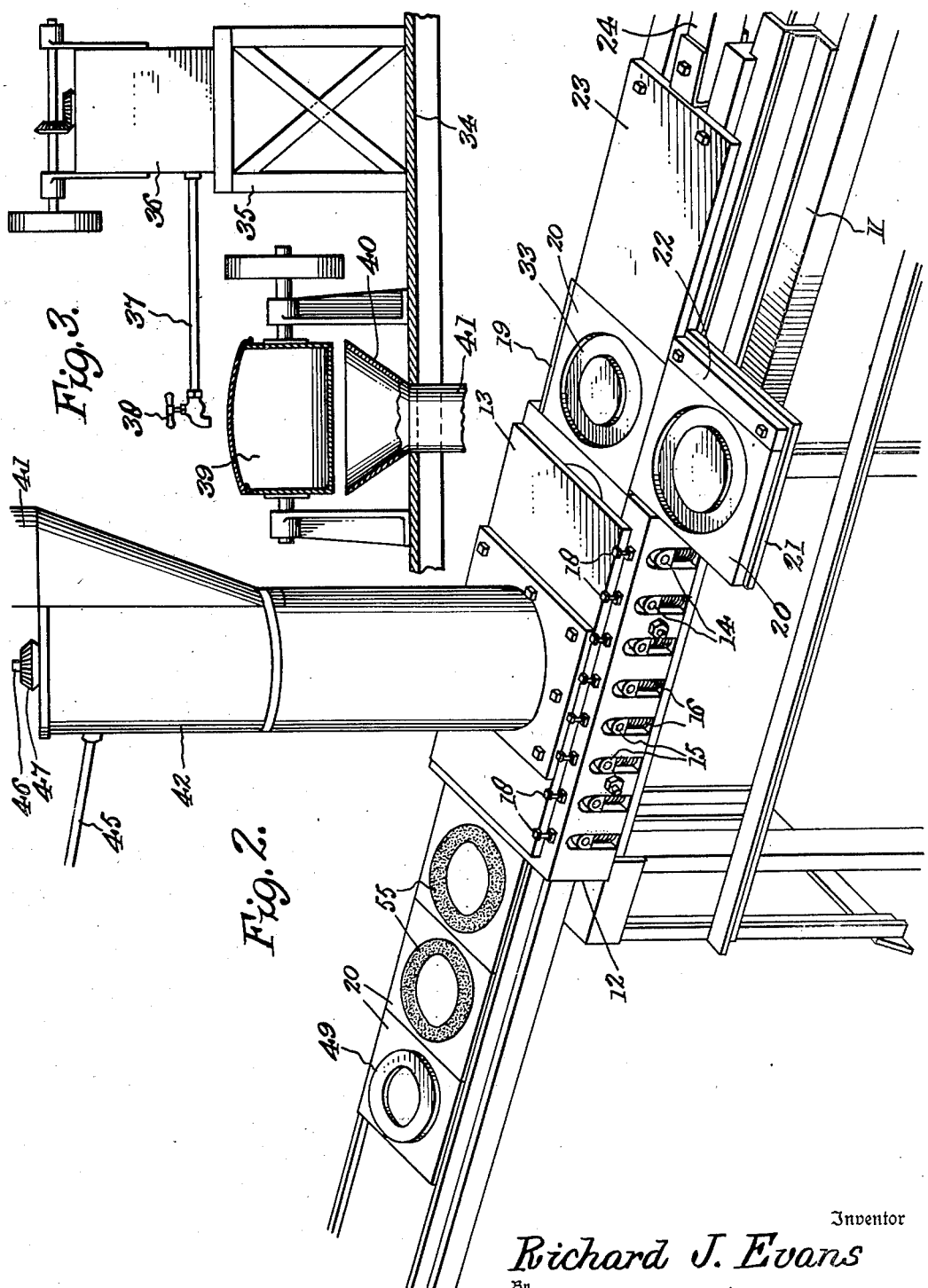

Oct. 30, 1934.  R. J. EVANS  1,978,744
POWER MOLD FILLING MACHINE
Filed Nov. 28, 1932   3 Sheets-Sheet 3
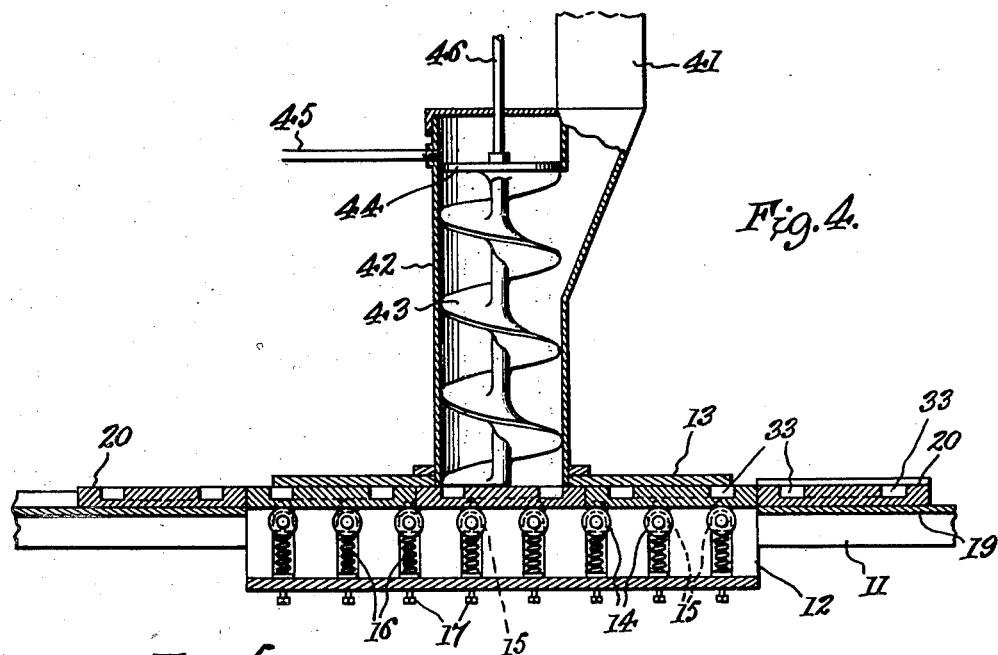
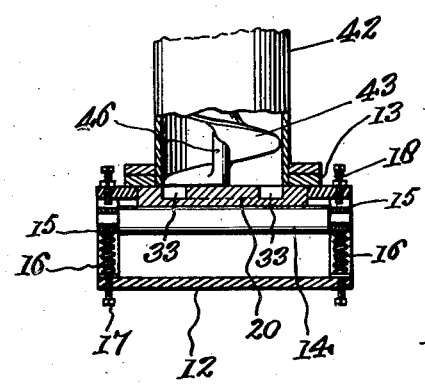
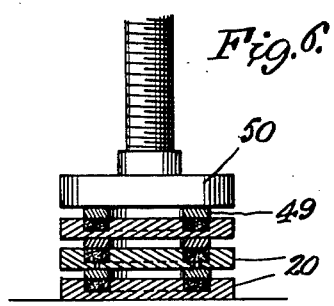
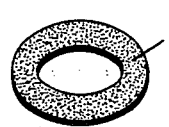
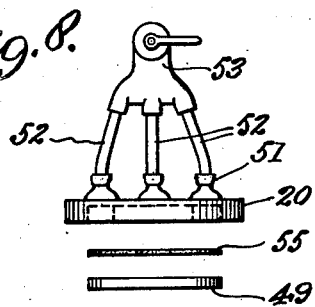
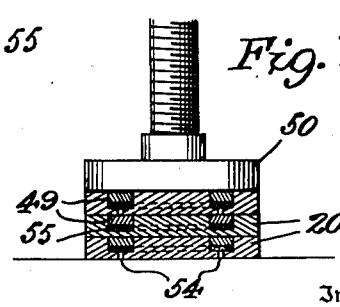
Inventor
Richard J. Evans
By Wilkinson & Mawhinney
Attorneys Patented Oct. 30, 1934

1,978,744

UNITED STATES PATENT OFFICE 1,978,744

POWER MOLD FILLING MACHINE

Richard J. Evans, Huntington, Ind., assignor to Asbestos Manufacturing Company, Huntington, Ind., a corporation of Indiana Application November 28, 1932, Serial No. 644,740

2 Claims. (Cl. 18—30)

The present invention relates to molding apparatus and more particularly to an improved type of machine for handling molds which may be fed consecutively and continually through the machine.

An object of the present invention is to provide a machine for handling a plastic mass composition of material adapted to be molded into friction elements such as clutch rings, brake linings and the like, and which is adapted to deliver to the molds the plastic composition under pressure and with the initially admixed proportions of the ingredients so as to obtain in the final product the various high percentages and uniformity in the ingredients placed initially in the mix and desired in the final product.

Another object of the present invention is to provide a relatively simple and inexpensive machine for handling at a relatively high rate of speed a continuous line of molds and for filling the molds under pressure to the desired extent so that the molds delivered are in condition for closing and subjecting to pressure to carry on the steps in the process of manufacture.

The invention also aims at the provision of a machine embodying an improved means for feeding the plastic mass under pressure into the mold and at the same time sealing the mold against the feeding mechanism and ordinarily wiping off the top of the mold to even up the content of the mold, all of which operations are carried out simultaneously with the feeding of the material and advancement of the molds through the machine.

A further object of the invention is to provide an improved means for supporting the molds during the filling operation and wherein slight variations in the thicknesses or dimensions of the mold is compensated for and the molds are at all times maintained in close fitting or sealing contact with the filling device.

Another object of the present invention is to provide an improved method or process of making friction elements by use of the machine of this invention and wherein improved means is provided for compressing the material in the molds and ejecting the finished articles therefrom.

A further object of the invention is to provide an improved mold advancing means, and improved material feeding means, and a connection between the two for effecting the desired relative operation of the two means so that the material may be fed proportionately to the speed of advancement of the travel of the molds to the machine.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a machine constructed according to the present invention for supplying a plastic material to the molds.

Figure 2 is a fragmentary enlarged perspective view of the body portion of the machine showing the molds in position thereon and the means for feeding the material and advancing the molds in the machine.

Figure 3 is a detail enlarged sectional view through the mixing device for the material and the hopper for feeding the material from the mixing device to the machine, the upper flooring for supporting these devices being shown in section.

Figure 4 is a fragmentary longitudinal section taken through the body portion of the machine showing the pressure feeding means for the plastic material and the supporting means for holding a row of molds in position to be filled.

Figure 5 is a transverse section taken through the material feeding portion of the machine showing the yieldably supported rollers for holding the mold in place.

Figure 6 is a fragmentary sectional view showing diagrammatically a pressure means for subjecting the material in the molds to pressure and for removing the surplus oil or other liquids from the plastic material.

Figure 7 is a similar view showing the molds after compression.

Figure 8 is a side elevation showing diagrammatically an article ejector for use with the molds and showing the follower and the article ejected therefrom, and Figure 9 is a detail perspective view of one form of friction element produced.

Referring now to the drawings, 10 designates a lower floor or support upon which the body of the machine is mounted, the machine having a suitably elongated frame 11, upon the intermediate portion of which is mounted a suitable housing 12 having slotted side plates and a closed top 13. The housing 12 carries a row of transversely disposed and spaced apart rollers 14, the trunnions of which are journalled in bearing blocks 15 slidably mounted in the slots of the casing 12 and which are normally urged upwardly by springs 16 disposed beneath the blocks 15 in the slots and regulated as to tension by set screws 17 or the like which pass upwardly through the bottom of the casing and are adapted for adjustment from the exterior thereof. The blocks 15 are limited in their upward sliding movement by stop screws 18 or the like which may be threaded downwardly through the top 13 of the casing and adjusted so as to determine the height limit of movement of the roller blocks 15. The frame 11 is provided at its forward or feeding end with a table 19 upon which are placed the empty molds 20, the latter being of rectangular or other suitable configuration for endwise abutting relation so as to consecutively advance the molds through the housing 12 over the rollers 14, as shown in Figure 4. The table 19 is preferably provided at the forward side of the machine with an extension table 21 having at one edge an upstanding cleat 22 against which the molds 20 may be initially placed to properly position the mold on the table extension.

It will be noted from Figure 2 particularly that the table extension 21 is of suitable length to accommodate at least one mold forwardly of the general longitudinal line of molds through the machine so that a mold may be initially placed upon the table extension 21 and be moved into line at the proper time. The molds are fed from the table 19 into position upon the rollers 14 in the housing 12 by a reciprocating feeder head 23 slidably mounted for longitudinal reciprocating movement on the frame 11 and disposed in the line of feed of the molds. The head 23 is connected by a pitman 24 to an eccentric pin 25 mounted on a disk 26 or the like to impart an eccentric movement to the outer end of the pitman 24 and thus reciprocate the feeder head 23. The disk 26 is mounted on a shaft 27 extending crosswise of the frame 11 and which has a gear wheel 28 thereon meshing with a pinion 29 on an upper shaft 30 which carries a pulley 31, over which is trained a belt 32. The shaft 27 may be driven in any suitable manner to supply power to the machine. The eccentric throw of the pitman 24 must at least equal the length of the mold 20 so that after projecting the line of molds forwardly into the machine, the feeder head must be retracted a distance sufficient to admit of the sliding of the mold on the table extension 21 backwardly into the line of feed so that this last mold will then be in position to receive the thrust of the feeder head 23 for advancing the line of molds.

Any suitable type of mold may be used with this machine within the limits of the construction; in the present instance, the mold is shown as having a circular cavity 33 to form friction clutch rings and the cavities 33 open through the tops of the molds so that they open upwardly against the top 13 of the housing 12 as the molds are moved lengthwise through the machine.

The machine embodies means for mixing a plastic composition to be used in the molds, and for this purpose, as shown in Figure 1, there may be disposed upon an upper floor 34 a stand or frame 35 upon which is mounted a tank 36 for oils or other suitable liquid to be used in the paste. The liquid is fed from the tank 36 through a pipe 37 controlled by a valve 38 or the like which overhangs a suitable mixer 39 for the dry constituents of the material. The dry ingredients are mixed thoroughly in the mixer 39 and by manipulating the valve 38, the oil or other liquid is added thereto to bring the admixture to the desired soft putty like consistency. The mixer 39 is disposed over a hopper 40 which opens into a downwardly extending chute or pipe 41 extending through the upper floor 34 downwardly through the desired distance and into position over the intermediate portion of the frame. The housing 12 carries an upstanding cylinder 42 which opens downwardly through the top 13 of the housing and directly on to the upper faces of the molds 20 supported on the rollers 14.

The pipe or chute 41 extends downwardly and opens into one side of the cylinder 42, as shown in Figure 4 particularly, to deliver the plastic material into the side of the cylinder 42 and a suitable worm screw feeder 43 is mounted vertically in the cylinder 42 for engaging the plastic material and forcing it downwardly against the upper faces of the molds. To assist the downward pressure or feeding of the material, the upper end of the cylinder 42 may be closed and provided therein with a disk or plate 44 spaced from the upper end of the cylinder 42 to provide an air chamber therein. The disk 44 rests upon the upper end of the worm screw feeder and is adapted to prevent the material from backing up beyond the feeder, the disk 44 being held in downwardly pressed position by compressed air admitted into the upper end of the cylinder 42 through a pipe 45 or the like. It will be noted from Figure 4 that the opening of the lower end of the chute 41 into the side of the cylinder 42 is spaced below the air chamber above the disk 44. The shaft 46 of the worm screw feeder 43 is connected through gears 47 to the pulley 48 over which the belt 32 is trained so as to operate the worm screw feeder relatively to the speed of operation of the mold feeding mechanism. In this way there is established a desired and proper relation between the feeding of the material and the feeding of the molds.

A uniform pressure of the material against the upper side of the mold is the result, and the lower end of the worm screw feeder 43 serves as a wiper to travel over the upper faces of the molds and wipe or cut off the material at the tops of the mold cavities so as to insure a proper distribution of the material throughout the entire mold cavity.

As the molds are thus filled at the lower end of the worm screw feeder 43, the molds are intermittently advanced forwardly through the machine and emerge from the opposite end of the housing 12. At this point, the follower rings 49 are placed on the molds at the top of the mold cavities and the molds thus closed are then placed in stack form, as shown in Figure 6, beneath a suitable press 50, and upon operation of the press, as shown in Figure 7, the rings or followers 49 are forced down into the mold cavity to compress the material and extract the surplus oil therefrom. It will be noted that the followers 49 are of a thickness at least the depth of the mold cavities so as to provide a space for the compressed material and to insure uniformity in the thickness of the molded product. After the material has been compressed in the molds, as shown in Figure 7, the molds may be inverted and brought individually into position beneath an ejector device, such as shown in Figure 8, and wherein the device may have resilient cups 51 carried on a plurality of pipe branches 52 connected to a controlling valve 53 adapted to be opened and closed at the will of the operator through any suitable mechanism and which admits compressed air through the pipe branches 52 and cup 51 against the bottom of the mold 20. The mold 20 is provided with air inlet openings 54 extending through the bottoms of the cavities so that the air under pressure from the pipes 52 may pass through the openings 54 into position beneath the molded articles and forcibly eject or drive the same together with the follower rings 49 out of the mold. The ejected article is shown at 55 and the follower rings 49 and the articles 55 may be separated and carried off to different points for further use and treatment. In Figure 9 the clutch ring, the product of the machine, is shown, and this may be subjected to baking, grinding or other treatment as is found necessary for the reduction of the thickness of the molded article and for the proper hardening and treatment thereof.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A power mold filling machine comprising a supporting frame open at each end, a material supplying means disposed over the frame for discharging material into the molds within the frame, said frame comprising upper and lower members, slotted side members, a plurality of transversely extending mold supporting rollers extending between the sides, bearings for said rollers vertically slidable in said slots of said side members, springs for yieldably supporting said bearings, and means for tensioning said springs.

2. A power mold filling machine comprising a supporting frame open at each end, a material supplying means disposed over the frame for discharging material into the molds within the frame, said frame comprising upper and lower members, slotted side members, a plurality of transversely extending mold supporting rollers extending between the sides, bearings for said rollers vertically slidable in said slots of said side members, springs for yieldably supporting said bearings, means for tensioning said springs, and threaded means engaging said bearings from above for limiting the upward movement of the bearings and rollers, said threaded means individually engaging each bearing.

RICHARD J. EVANS.